United States Patent [19]

Sugalski et al.

[11] Patent Number: 4,559,700

[45] Date of Patent: Dec. 24, 1985

[54] METHOD FOR WINDING AN ELECTRODE ASSEMBLY

[75] Inventors: Raymond K. Sugalski, Gainesville; John J. Strickland, Alachua, both of Fla.

[73] Assignee: General Electric Company, Gainesville, Fla.

[21] Appl. No.: 648,918

[22] Filed: Sep. 10, 1984

[51] Int. Cl.[4] .................. H01M 6/10; H01M 4/88
[52] U.S. Cl. ..................... 29/623.1; 29/730; 242/7.02
[58] Field of Search .............. 29/623.1, 730, 731; 429/94; 242/7.02

[56] References Cited

U.S. PATENT DOCUMENTS

| | | | |
|---|---|---|---|
| 4,099,401 | 7/1978 | Hug et al. | 29/623.1 |
| 4,203,206 | 5/1980 | Morris et al. | 29/731 |
| 4,296,546 | 10/1981 | Hill et al. | 29/730 |
| 4,360,140 | 11/1982 | Morris | 226/162 |
| 4,369,571 | 1/1983 | Sugalski | 29/731 |
| 4,402,784 | 9/1983 | Romero-Medrano | 156/446 |

*Primary Examiner*—Donald L. Walton
*Attorney, Agent, or Firm*—Henry J. Policinski

[57] ABSTRACT

A method for winding electrode assemblies useable in electrochemical cells is provided wherein first and second winding stations are provided. A first unwound electrode assembly is partially wound at the first winding station into a first partially wound electrode assembly and then transferred to the second winding station where the first partially wound electrode assembly is further wound. A second unwound electrode assembly is partially wound at the first winding station into a second partially wound electrode assembly contemporaneously with the further winding of the first partially wound electrode assembly at the second winding station.

10 Claims, 10 Drawing Figures

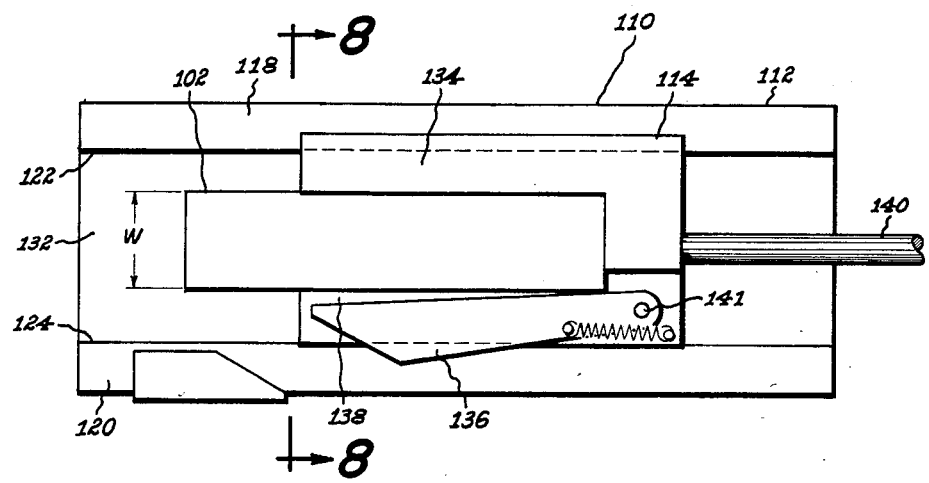
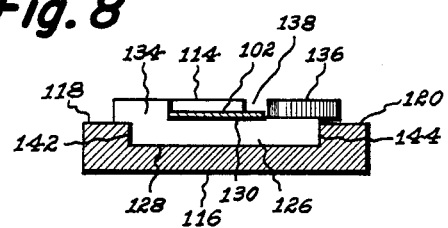

METHOD FOR WINDING AN ELECTRODE ASSEMBLY

This invention relates to method for winding an electrode assembly for rechargeable electrochemical cells and more particularly to a method for winding an unwound electrode assembly into a wound cylindrical electrode assembly and thereafter inserting the wound cylindrical assembly into a cell container.

It is well known in the art to construct rechargeable electrochemical cells by winding an unwound electrode assembly comprised of negative and positive electrode strips, with a separator material spaced therebetween, into a completely wound cylindrical electrode assembly and then placing the wound assembly into a container. Much effort has been put forth in automating the winding of the electrode assembly and insertion of the assembly into the container. One such effort, embodied in the machine described and claimed in U.S. Pat. No. 4,203,206, has proved particulary suitable in achieving efficient and cost-effective winding and insertion of the wound assembly into the cells container. In the machine described in the above-mentioned patent the negative and positive electrodes, with the separator therebetween, are introduced at a single nest location in the machine, and wound at that location by a pair of arbor segments into a cylindrical electrode assembly. Winding of the entire electrode assembly is achieved at the single nest location. Since only one winding station is available for winding at any one time, only one electrode assembly may be wound at any one time and hence the overall output speed of the machine is limited by the period of time required to wind the entire assembly. Said another way, the rate at which cell containers with wound electrode assemblies inserted therein are discharged from the machine is limited to being no greater than the rate at which the winding of the entire electrode assembly into a cylindrical roll is accomplished. The output of a factory production line having one of these machines can only be increased by adding one or more similar machines, or substantial portions thereof, to the production line. This, of course, is expensive and economically burdensome.

Accordingly, it is an object of the present invention to provide an efficient and cost-effective method for winding electrode assemblies and inserting assemblies into cell containers.

It is another object of the present invention to provide a method for winding electrode assemblies and for inserting the wound assemblies into cell containers wherein winding of the assemblies is accomplished at a rate faster than the rate found in prior art methods and machines.

SUMMARY OF THE INVENTION

Briefly stated, these and other objects, as well as advantages, which will become apparent hereinafter, are accomplished by the present invention which, in one form, provides a method for contemporaneously winding first and second unwound electrode assemblies of an electrochemical cell into a cylindrical configuration. Each of said assemblies are comprised of a negative electrode strip, a positive electrode strip and a separator disposed therebetween. The method is comprised of the steps of providing first and second winding stations, partially winding at the first station the first unwound electrode assembly into a first partially wound electrode assembly, transferring the first partially wound electrode assembly from the first winding station to the second winding station and further winding at the second winding station said first partially wound electrode assembly. The method further comprises partially winding the second unwound electrode assembly at the first winding station into a second partially wound electrode assembly contemporaneously with the further winding of the first partially wound electrode assembly at the second winding station. Since at least a portion of one electrode assembly is always wound contemporaneously with another electrode assembly, the method of the present invention can wind any given number of electrode assemblies in less time than the time required to wind the same given number of electrode assemblies sequentially as is current practice in prior art machines and methods.

DESCRIPTION OF THE DRAWINGS

While the specification concludes with claims particularly pointing out and distinctly claiming the present invention, the invention will be more readily understood from the following description of the preferred embodiments which are given by way of example with the accompanying drawings in which:

FIG. 7 schematically depicts a top view of a shuttle mechanism for delivering an electrode strip to the winding arbors of a winding machine in accordance with the present invention.

FIG. 8 depicts a cross-sectional view taken along the line 8—8 of FIG. 7.

DESCRIPTION OF THE PREFERRED EMBODIMENT

Figure 1:
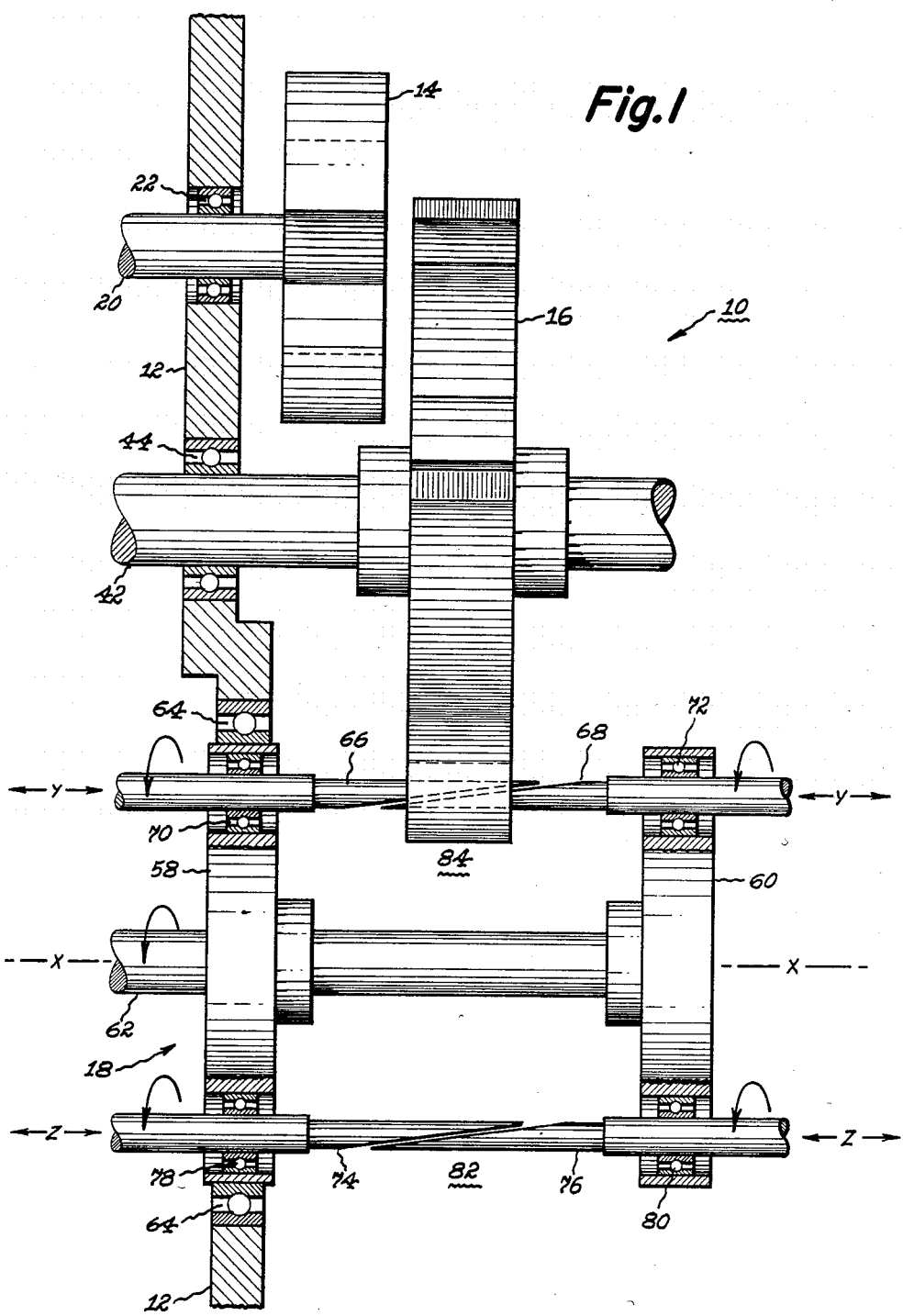
FIG. 1 schematically depicts a structure useful in practicing the method of the present invention.
Figure 2:
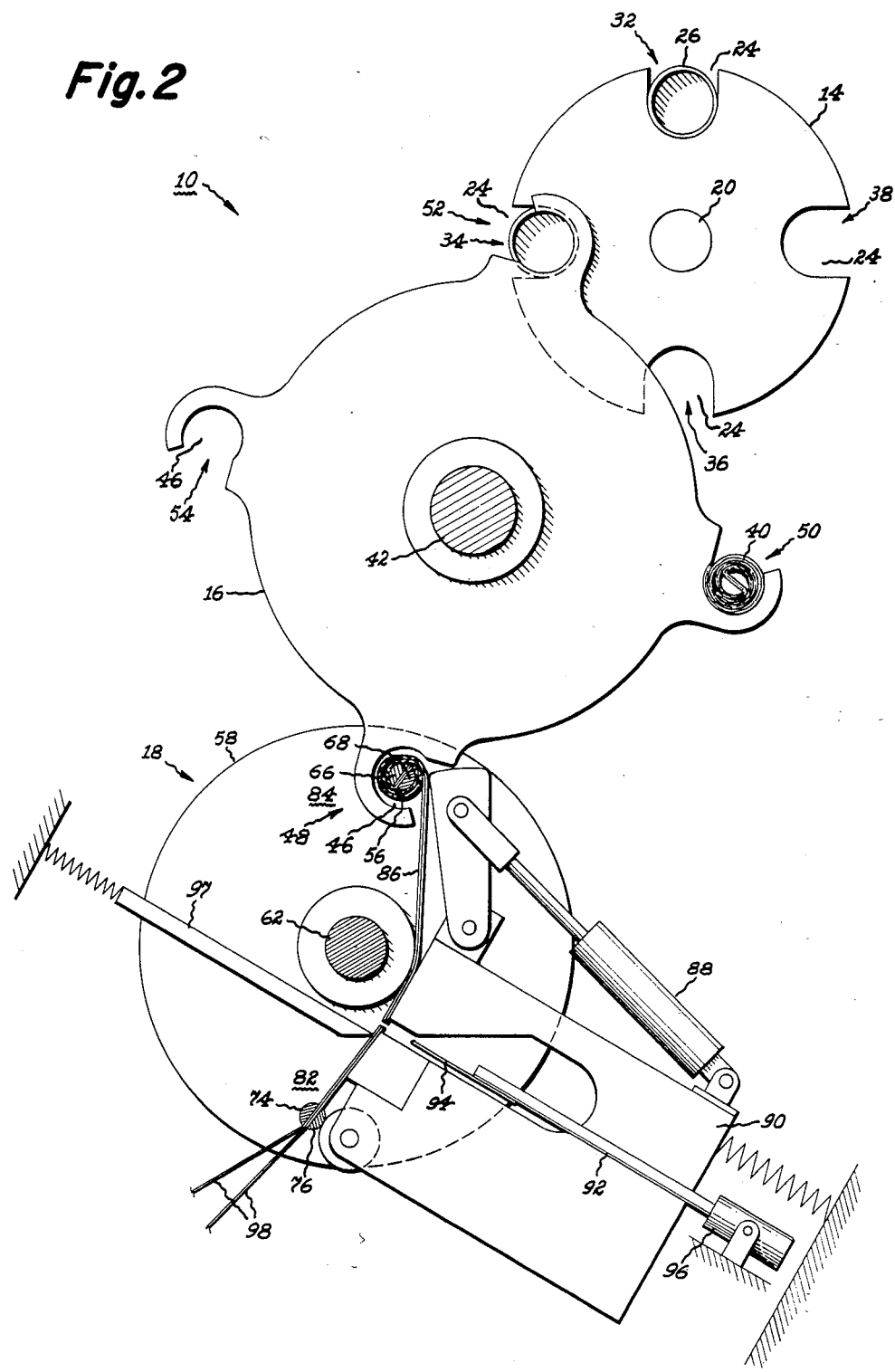
FIG. 2 schematically depicts a view of structure incorporating that depicted in FIG. 1 disposed in a first position during the practice of the method of the present invention.

Referring now to FIGS. 1 and 2 there is schematically depicted at 10 structure useful in practicing the method of the claimed invention. The structure 10 is comprised of an immovable frame member 12 to which a plurality of generally circular wheels 14 and 16 and an orbiting wheel 18 each of which are mounted for selective rotation with respect to frame member 12.

Canning wheel 14 is mounted to frame member 12 for selective rotation with respect thereto via a first shaft 20 supported for rotation by bearing 22 residing in frame member 12. Wheel 14 contains a plurality of recesses 24 disposed at its periphery and each opened at both ends to receive a cylindrical cell container 26.

Rotation of canning wheel 14 is effective to move each recess 24 to a plurality of canning wheel index positions 32, 34, 36, 38. A recess 24 located at canning wheel index position 32 is adapted to receive a cell container 26 therein from a supply (not shown) of cell containers 26. From canning wheel index position 32, the recess 24, with cell container 26 residing therein, is moveable via selective rotation of canning wheel 14 to canning wheel index position 34 where a totally wound electrode assembly 40 may be inserted into cell container 26 in a manner hereinafter to be described. From canning wheel index position 34, the recess 24, with cell container 26 and totally wound electrode assembly 40 residing therein, is moveable via selective rotation of canning wheel 14 to canning wheel index position 36. At index position 36, cell container 26 may be removed from recess 24. From canning wheel index position 36, recess 24 is moveable via selective rotation of canning wheel 14 to canning wheel index position 38. At index position 38, recess 24 awaits relocation back to canning wheel index position 32 where the recess 24 may receive another cell container 26.

Wheel 16, more specifically termed a transfer wheel, is mounted to frame member 12 for selective rotation with respect thereto via a second shaft 42 supported for rotation by bearing 44. Transfer wheel 16 contains a plurality of electrode assembly receiving channels 46 disposed at the periphery of the wheel 16. Each channel 46 is moveable by rotation of transfer wheel 16 to a plurality of transfer wheel index positions 48, 50, 52, 54. At transfer wheel index position 48, each channel 46 receives a partially wound electrode assembly 56. In a manner hereinafter to be more fully explained, partially wound electrode assembly 56 is further wound within channel 46 (while channel 46 is residing at index position 48) to form a totally wound electrode assembly 40. From transfer wheel index position 48, channel 46, with totally wound electrode assembly 40 residing therein, is moveable via selective rotation of transfer wheel 16 to index position 50 (a holding position) and thence to index position 52. Transfer wheel 16 and canning wheel 14 are disposed relative to one another so as to be rotatable about separate axis parallel to one another. The axis of rotation of transfer wheel 16 is spaced apart from the axis of rotation of canning wheel 14 by a distance sufficient to permit transfer wheel index position 52 to register or overlap with canning wheel index position 34. As best viewed in FIG. 1, canning wheel 14 and transfer wheel 16 are further disposed so as to reside in different planes perpendicular to their respective parallel axes of rotation. With canning wheel 14 and transfer wheel 16 located in this manner channel 46 overlaps and is in registering relationship with recess 24. Accordingly, totally wound electrode assembly 40 may be pushed (by means not shown) out of channel 46 into the cell container 26 residing in recess 24. After removal of electrode assembly 40 from channel 46 in this manner, channel 46 is moveable from index position 52 to index position 54. At index position 54, channel 46 awaits transfer back to index position 48 to receive another partially wound electrode assembly 56.

Orbiting wheel assembly 18, shown in cross-section in FIG. 1, is comprised of a pair of generally circular wheels 58 and 60 spaced axially apart from each other and extending perpendicular to, and radially outward from, a central drive shaft 62. Wheels 58 and 60, which are disposed in parallel planes, are affixed to drive shaft 62 for selective rotation therewith about axis x—x. Bearing 64, mounted in frame 12, supports central drive shaft 62 for rotation (by means not shown) to effect selective orbiting of wheel assembly 18 about axis x—x in a manner and for purposes hereafter to be described.

As just previously stated, circular wheels 58 and 60 are disposed parallel to each other in a spaced-apart relationship along the axis x—x. Wheel assembly 18 is positioned with respect to transfer wheel 16 in such a manner that transfer wheel index position 48 extends into the space between spaced-apart circular wheels 58 and 60. A first pair of winding arbors 66 and 68, mounted in wheel assembly 18, are adapted to be advanced into and retracted from a channel 46 disposed at transfer wheel index position 48. Arbor 66 is supported for selective rotation (by means not shown) by bearing 70 mounted in wheel 58. In addition to being rotatable about axis y—y, arbor 66 is translatable (by means not shown) along the axis y—y so that arbor 66 may be selectively advanced into and retracted from a channel 46 disposed at transfer wheel index position 48.

Arbor 68 is supported for selective rotation (by means not shown) by bearing 72 mounted in wheel 60 of wheel assembly 18. In addition to being rotatable about axis y—y, arbor 68 is also translatable (by means not shown) along the axis y—y so that arbor 68 may be advanced into and retracted from a channel 46 disposed at transfer wheel index position 48.

A second pair of winding arbors 74 and 76 are mounted in wheel assembly 18 in a manner displaced 180° from the circumferential position of arbors 66 and 68 on wheel assembly 18. More specifically, winding arbor 74 is mounted for selective rotation on circular wheel 58 at a point 180° displaced from arbor 66 and at a point which is the same distance from the x—x axis as the distance of arbor 66 is from the x—x axis. Bearing 78, mounted in wheel 58, supports arbor 74 for rotation about the z—z axis. Similarly, winding arbor 76 is mounted for selective rotation on circular wheel 60 at a point 180° displaced from arbor 68 and at a point which is the same distance from the x—x axis as the distance of arbor 68 is from the x—x axis. Bearing 80, mounted in wheel 60, supports arbor 76 for rotation about the z—z axis. In addition to being rotatable about the z—z axis, each winding arbor 74 and 76 is translatable along the z—z axis. More specifically, arbors 74 and 76 are each translatable (by means not shown) along the z—z axis from the position shown in FIG. 1 to a position wherein arbors 74 and 76 do not overlap.

Winding arbors 74 and 76, when disposed in the position depicted in FIG. 1, extend into a first winding location or station shown generally at 82. In addition to arbors 74, 76, first winding station 82 is adapted to receive (in a manner hereinafter to be described) the components of an unwound electrode assembly. Rotation of arbors 74 and 76 about the z—z axis wind of the unwound electrode assembly into a partially wound electrode assembly 56 at winding station 82.

A second winding station, shown generally at 84, is defined at and coincident with transfer wheel index position 48. More specifically, channel 46 disposed in index position 48 is adapted to receive arbors 66 and 68 and partially wound electrode assembly 56. Rotation of arbors 66 and 68 about the y—y axis will effect, at winding station 84, further winding of partially wound electrode assembly 56 into the completely or totally wound electrode assembly 40.

As stated earlier, winding arbors 56 and 68 are rotatable about axis y—y and winding arbors 74 and 76 are rotatable about axis z—z. Rotation about these axes is effective to wind electrode assemblies; in the case of arbors 74, 76, rotation is effective to produce a partially wound electrode assembly 56 and, in the case of arbors 66, 68, rotation is effective to produce a totally wound electrode assembly 40. In addition to the aforemetioned rotation of arbors 66, 68, 74 and 76, the entire wheel assembly 18 is rotatable about axis x—x by rotation of shaft 62. Rotation of the entire wheel assembly 18 about the x—x axis, is effective to relocate arbor pair 66, 68 and arbor pair 74, 76 about the x—x axis until arbor pair 66, 68 resides at winding station 84 and arbor pair 74, 76 resides at winding station 82. More specifically, after a partially wound electrode assembly 56 has been partially wound at winding station 82, the entire wheel assembly 18 is rotated about the x—x axis whereby the partially wound electrode assembly and arbors 74 and 76 are transferred from winding station 82 to winding station 84. The same rotation of wheel assembly 18 about the x—x axis simultaneously transfers winding arbors 66, 68 from winding station 84 to winding station 82. In this manner hereinafter described in more detail, arbor pairs 66, 68 and 74, 76 may be sequentially displaced from winding station 82 to winding station 84 and back to winding station 82 in order to effect winding of a plurality of electrode assemblies.

FIG. 2 schematically depicts the aforedescribed winding structure in a first position during the process of the present invention. More specifically, wheel assembly 18 is shown in FIG. 2 just after it has rotated counter-clockwise whereby arbor pair 66, 68 and partially wound electrode assembly 56 have been displaced from winding station 82 to winding station 84. As further depicted in FIG. 2, arbor pair 66, 68 and partially wound electrode assembly 56 are received in channel 46 disposed at transfer wheel index position 48. The unwound portion 86 of partially wound electrode assembly 56 is depicted in FIG. 2 as extending out of channel 46. A first air cylinder actuated pressure plate mechanism 88 provides a slight force against partially wound electrode assembly 56 at winding station 84 to keep the partially wound electrode assembly 56 from unwinding. Similarly, a second spring actuated pressure mechanism 90 provides a slight force to the unwound electrode assembly at winding station 82. Separator severing mechanism 92 utilizes a heated wire 94, moveable by an air cylinder 96 into contact with a pair of separator strips 98, to sever the separator strips 98 from a pair of continuous reels (not shown) of separator material. As an alternative to actuation by air cylinder 96, separator severing mechanism 92 may be cam actuated by providing a cam and follower mechanism between mechanism 92 and orbiting wheel 18. In a manner hereinafter to be described, a third spring actuated pressure mechanism 97 exerts a slight pressure on separator strips 98 whereby separator strips 98 remain taut during the severing operation. Mechanism 97 also keeps separator strips 98 positively located during the steps comprising the present invention. As depicted in FIG. 2, the separator has already been severed.

It has been found to be advantageous to provide for back-tensioning of the separator strips 98 while they remain connected to the supply reels. Otherwise, the inertia of the turning supply reels tends to feed excess strip material off the reels thus creating slack in separator strips 98 between the reels 98 and the arbor pairs 74, 76. Back-tensioning may be readily accomplished by applying a braking force directly to the supply reels. Alternatively, back-tensioning may be accomplished by applying a braking force directly to the separator strips 98 at a location between the supply reels and the arbors 74, 76. With this alternative approach, a tension inducing force may be applied directly to the strips 98 at a location between the arbors 74, 76, and the location at which the braking force is applied. In this alternative approach, the braking force insures that the aforementioned slack will be avoided and the tension inducing force insures that sufficient tension is provided in separator strips 98 for winding at arbors 74, 76 to be accomplished.

FIG. 2 depicts a partially wound electrode assembly 56 at winding station 84 and a pair of separator strips 98 extending between and past arbor 76 and 74 at winding station 82. The first step in the method comprising the present invention introduces negative electrode 102 and positive electrode 104 into close proximity to winding station 82. It is preferable to utilize an automatic feed mechanism (not shown) commonly found in the art, such as a pick-and-place mechanism, to pick up electrodes 102 and 104 from a supply and to place the electrodes on a shuttle mechanism for bringing the electrode 102, 104 into the proximity of winding station 82. The automatic feed mechanism may comprise a rotatable carousel having at least two stations. While one station is being used to feed electrodes to the winding machine 10, the other station may be loaded with electrodes by the machine operator. When the supply of electrodes at the first station is exhausted, the carousel may be rotated whereby electrodes may be fed to the winding machine from the station just previously loaded and the empty station may then be loaded with a fresh supply of electrodes by the machine operator.

While electrodes 102, 104 are being introduced in close proximity to winding station 102, arbors 74 and 76 are rotated approximately one-half turn whereby arbors 74, 76 grip the pair of separator strips 98. It has been found very advantageous to provide for rotation of each of the arbors 74 and 76 about axis z—z from a single drive mechanism in order that rotation of the arbors 74 and 76 occur simultaneously. This may be accomplished through the application of state of the art techniques such as gearing arbors 74 and 76 to a single central drive shaft or to the same planetary gear. It has also been found very advantageous to provide for rotation of each of the arbors 66 and 68 about axis y—y from the same drive mechanism which provides for rotation of arbors 74 and 76 about the z—z axis. Accordingly, it is preferred to provide for rotation of arbor pair 74, 76 and arbor pair 66, 68 from a single drive mechanism such that rotation of all arbors 66, 68, 74 and 76 occurs simultaneously. Therefore, when arbors 74 and 76 were rotated one-half turn in order to permit the arbors 74, 76 to grip the separator strips 98 as described above, arbors 66, 68 also rotate one-half turn thereby slightly further winding partially wound electrode assembly 56 at winding station 84.

Figure 3:
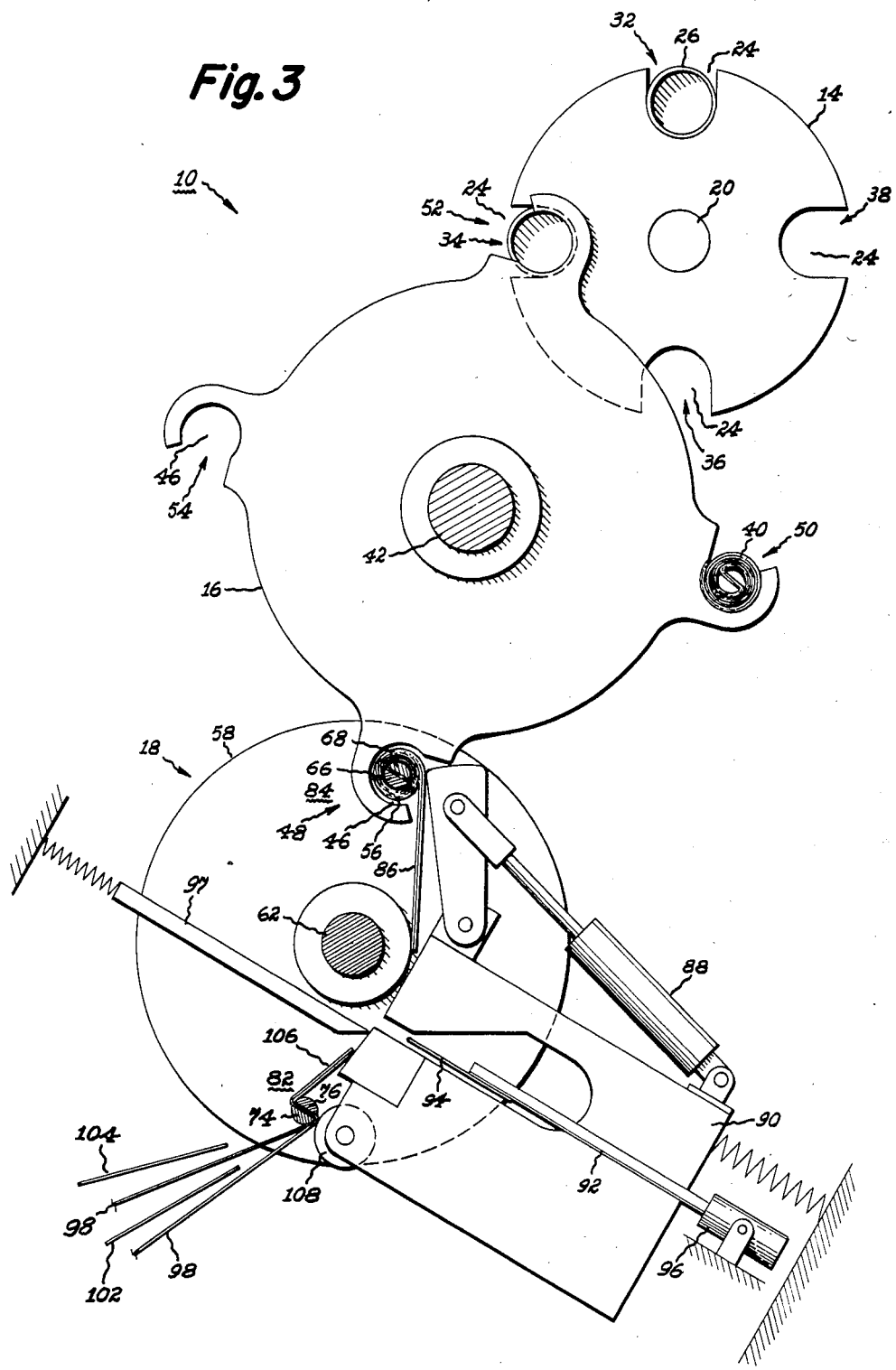
FIG. 3 schematically depicts the structure of FIG. 2 disposed in a second position during the practice of the method of the present invention.

FIG. 3 depicts schematically the position of the winding structure after the aforementioned one-half turn of arbors 74 and 76 and after introduction of electrode 102 and 104 to the proximity of the winding station. As viewed in FIG. 3, the separator strips have a portion 106 extending past the arbors 74 and 76 in order that the initial interior turns of the electrode assembly have additional layers of separator material disposed between the electrode 102 and the electrode 104.

From the position shown in FIG. 3, the next step in the method is to introduce the negative electrode 102 to the winding station 82 in such a manner that the electrode 102 is disposed between the separator strips 98 with its leading edge immediately adjacent to arbors 74, 76. In this position, a spring actuated pressure mechanism 90 acting through a pressure wheel 108 provides sufficient force on the sandwich comprised of separator strips 98 and the leading edge of electrode 102 such that additional rotation of arbors 74, 76 will result in the bending of the leading edge of the electrode 102 around arbors 74, 76. Upon presentation of the electrode 102 to the arbors 74, 76 in the manner just described, arbors 74, 76 are rotated an additional one and one-half revolutions to the position shown in FIG. 4. As previously indicated since arbors 74 and 76 are driven by the same drive mechanism as arbors 66 and 68, rotation of arbors 74 and 76 through one and one-half revolutions effects rotation of arbors 66 and 68 through a rotation of one and one-half revolutions thereby slightly further winding partially wound electrode assembly 56.

Figure 4:
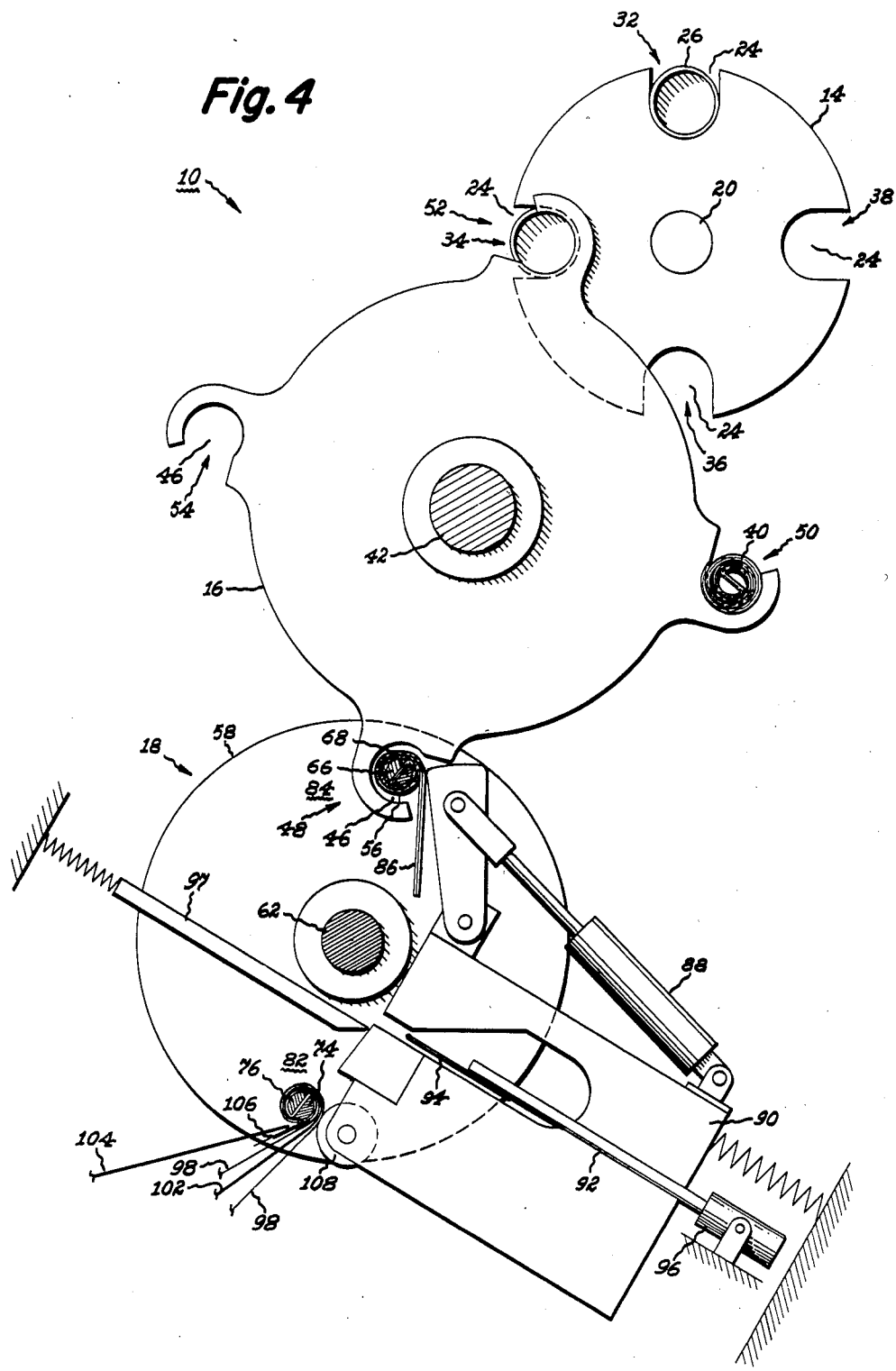
FIG. 4 schematically depicts the structure of FIG. 2 disposed in a third position during the practice of the method of the present invention.
Figure 4A:
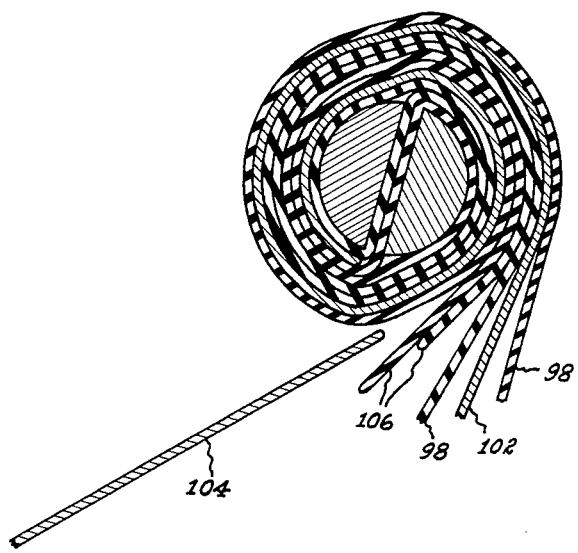
FIG. 4a is an enlarged schematic view of an initially wound electrode assembly disposed at the first winding station in the position depicted in FIG. 4.

In FIG. 4, arbors 76, 74 at winding station 82 are depicted after rotation of the additional one and one-half turns just previously mentioned. With reference to FIG. 4a in conjunction with FIG. 4, it is observed that electrode 102 with separator strip 98 on each side thereof has been wound around arbors 74, 76 approximately one and one-half times. In this position while the portion 106 of separators 98 has been partially wound in the very initial winding of the electrode 102, there remains a short segment of portion 106 which is unwound. It is further observed that the unwound segment (commonly called split tail) of portion 106 and the separator strips 98 present a triple thickness of separator strip material 98 on one side of electrode 102. The remaining positive electrode 104 may then be inserted at winding station 82 such that the triple thickness of separator strips 98 resides between the leading edge of electrode 104 and electrode 102. Triple thickness is provided to add additional separator material to protect against an electrical short circuit which could be otherwise caused by electrical contact between the leading edge of electrode 102 and electrode 104. This area of the electrode assembly is susceptable to electrical shorting since as the electrode 104 is initially wound, its leading edge has a tendency to dig through the separator strip 98 and into contact with electrode 102. A triple thickness of separator material 98 provides an adequate barrier to prevent this contact.

Upon insertion of the electrode 104 in the manner just described arbors 74, 76 are rotated about the axis z—z a substantial number of turns so as to partially wind at winding station 82 electrodes 102, 104 and separator strips 98 into a partially wound electrode assembly 56. Again since arbors 74, 76 are driven by the same drive mechanism as arbors 66, 68, the drive mechanism is effective not only to rotate arbors 74, 76 and partially wind at station 82 the unwound electrode assembly into partially wound assembly 56 but also is effective to rotate arbors 66, 68 and simultaneous cause finish winding at winding station 84 of electrode 56 into a completely or totally wound electrode assembly 40.

Ideally, the time spent in winding the partially wound electrode 56 at winding station 82 is equal to the time spent in finish winding the totally wound electrode assembly 40 at station 84. Since the diameter of the electrode assembly grows as winding of the assembly progresses, equal winding times at station 82 and 84 will result in a greater portion of the electrode assembly being wound at station 84 than at station 82.

Figure 5:
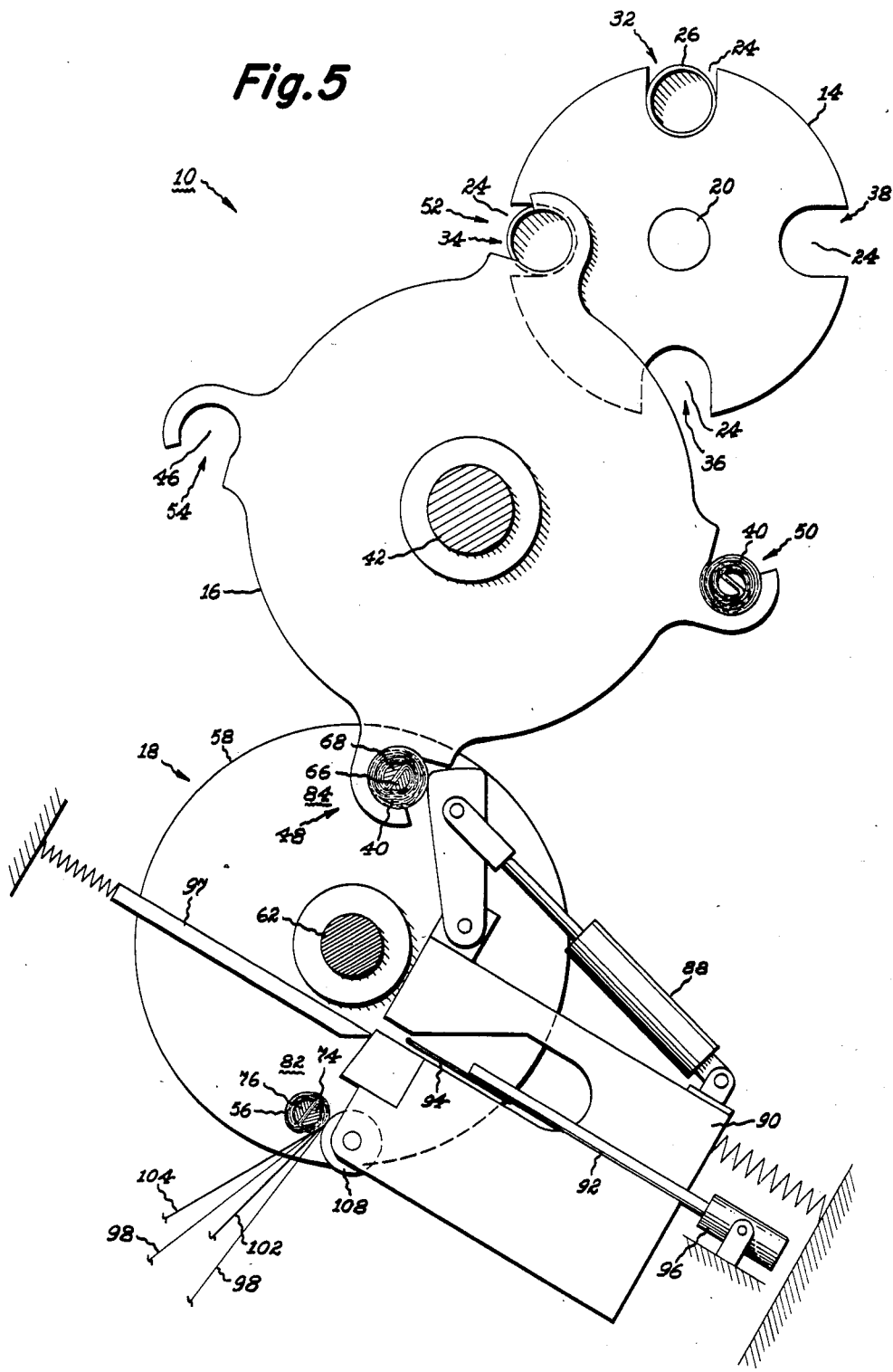
FIG. 5 schematically depicts the structure of FIG. 2 disposed in a fourth position during the practice of the method of the present invention.

FIG. 5 depicts the winding structure just subsequent to the aforementioned simultaneous partial winding at winding station 82 and the finish winding at winding station 84. Accordingly, a completely or totally wound electrode assembly 40 is depicted at winding station 84 and a partially wound electrode assembly 56 is depicted at winding station 84. The next step in the method comprising the present invention is the transfer of partially wound electrode assembly 56 from winding station 82 to winding station 84. More specifically, after arbors 66 and 68 are withdrawn from channel 46 at transfer wheel index position 48, transfer wheel 16 is rotated counterclockwise by shaft 42 thereby moving completely wound electrode assembly from transfer wheel index position 48 to transfer wheel index position 50. Rotation of wheel 16 in this manner also moves an empty channel 46 from transfer wheel index position 54 to transfer wheel index position 48 where the empty channel 46 awaits insertion of a partially wound electrode assembly 56. Finally, rotation of transfer wheel 16 transfers a previously completely wound electrode assembly 40, from index position 50 to index position 52 where the assembly 40 awaits insertion into cell container 26.

After with rotation of wheel 16, orbiting wheel assembly 18 is rotated 180° about the x—x axis by shaft 62 thereby moving arbors 66, 68 from winding station 84 to winding station 82. Rotation of orbiting wheel 18 in this manner also moves partially wound electrode assembly 56, with arbors 74, 76 still inserted therein from winding station 82 to winding station 84. At winding station 84 partially wound electrode assembly 56 is placed in empty channel 46 of transfer wheel 16. In other words, rotation of shaft 62 rotates wheel assembly 18, including arbors 66, 68 and 74, 76, along with the partially wound electrode assembly 56. This rotation transfers partially wound electrode assembly 56 from winding station 82, where it has been partially wound, to winding station 84 where it will be wound into a completely or totally wound electrode assembly 40 during the next step in the method comprising the present invention. After rotation of orbiting wheel assembly 18 in the manner just described, arbors 66, 68 are translated towards each other along axis y—y (now at winding station 82) in such a manner that separator strips 98 reside between arbors 66 and 68.

Figure 6:
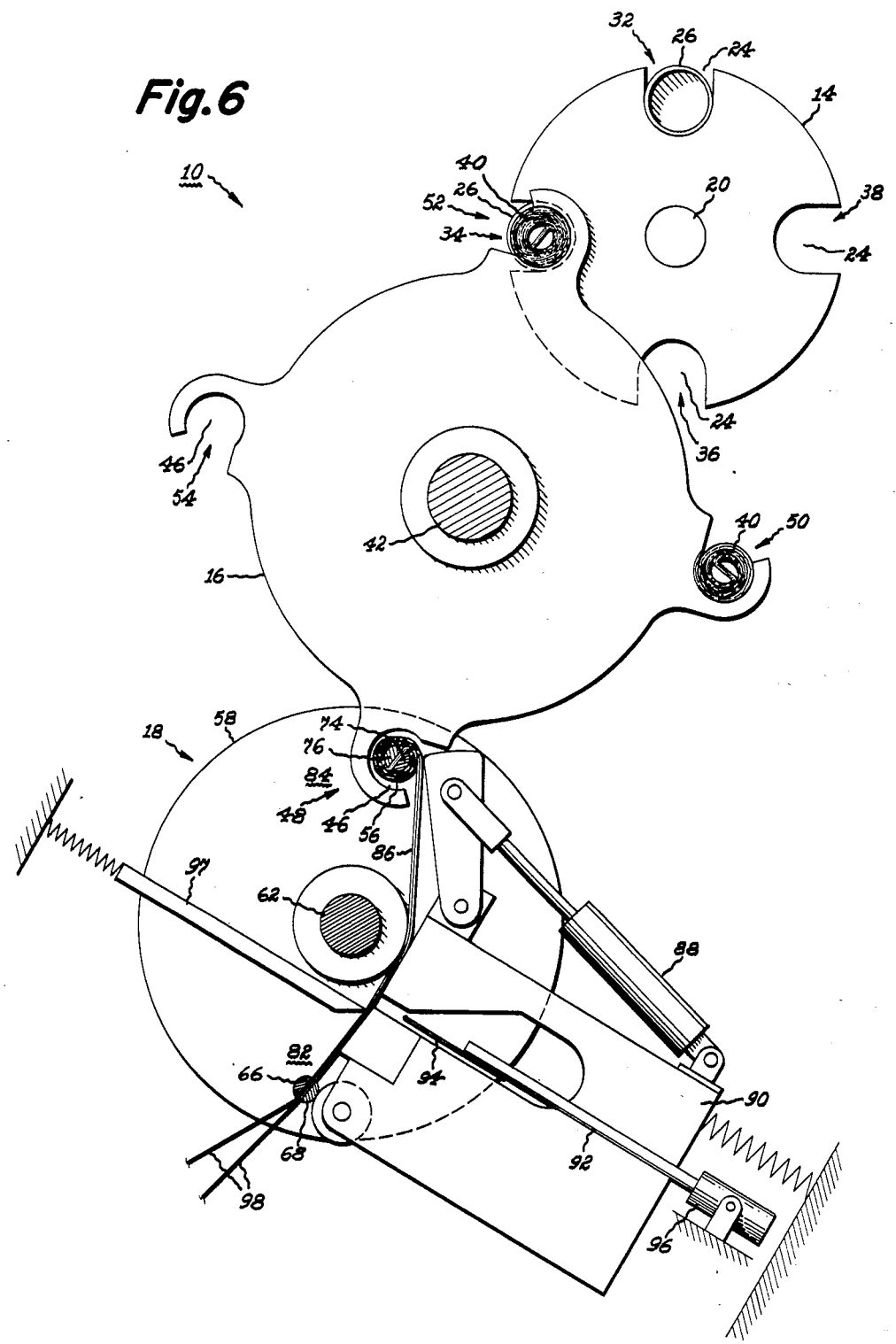
FIG. 6 schematically depicts the structure of FIG. 2 disposed in a fifth position during the practice of the method of the present invention.

FIG. 6 depicts the winding structure just after rotation of wheels 16 and 18 in the manner just previously described. As may be observed from FIG. 6, a partially wound electrode assembly resides in channel 46 at index position 48. Fully wound electrode assemblies 40 reside in channels 46 at transfer wheel index positions 50 and 52. The separator strip 98 still remains connected to their respective continuous rolls (not shown). An important aspect of the present invention, provides for, as previously described, insertion of arbors 66, 68 on each side of separator strips 98 before the separator strips 98 are severed from their continuous roll supply. In addition, pressure mechanism 97 traps and positively locates the separator strips during the severing strip. More specifically, the method comprising the present invention provides means for grasping the separator strips 98 at a location between the first and second winding stations by pressure mechanism 97. Severing of separator strips 98 is accomplished by actuation of separator severing mechanism 92 for reciprocal movement whereby a heated wire 94 is brought into contact with separator strips 98 at a point between the location at which mechanism 97 grasps the separator strips 98 and the second winding station.

Nearly contemporaneously with severing of separator strips 98, completely wound electrode assembly 40 is pushed (by means not shown) from the channel 46 at transfer wheel index position 52 and into cell container 26. Upon completion of these remaining method steps the winding structure 10 appears in the position shown in FIG. 2 and the steps of the method of the present invention are repeated to wind additional electrode assemblies.

In this manner then successive electrode assemblies are wound at first and second winding stations and inserted into cell containers. Because initial partial winding of an electrode assembly occurs at first winding station 82 simultaneously with the final winding at a second winding station 84 of another electrode assembly previously partially wound at the first winding station, the present method is faster than methods previously known in the art. More specifically, the output of totally wound electrode assemblies by the present invention may be twice as fast (not considering the orbiting time of wheel 18) as previous methods sequentially winding the entire electrode assemblies at one station.

It has been found that presentation of the leading edge of the electrode to the winding arbors must be accomplished with careful precision to avoid spiralling of the electrode assembly. More specifically, if the electrode strip is skewed when presented to the winding arbors, winding of the electrode will result in successive turns of the electrode being offset from one another. In other words, any given turn of the electrode will not exactly overlap with the previously wound turn or turns. This undesireable result is commonly called spiralling. Previous approaches aimed at preventing spiralling have utilized a shuttle or carrier mechanism to move and present the electrode to the winding arbors. In these approaches, the electrode is received in a fixed cavity in the shuttle with the cavity being dimensioned to very tightly fit around the electrode. While these approaches have been successful in properly presenting the electrode to the winding arbors, the tight fit between the cavity and the electrode have resulted in significant difficulty in loading the electrode into the shuttle mechanism. Automatic loading apparatus frequently misplaces the electrode with respect to the cavity of the shuttle mechanism resulting in skewing of the electrode and improper presentation of the electrode to the winding arbors. The following feature of the present invention addresses this difficulty.

Referring now to FIGS. 7 and 8, there is schematically depicted a shuttle or carrier mechanism 110 for receiving an electrode 102 from a source of electrodes and for moving and presenting the electrode to winding arbors 66, 68 and 74, 76. Shuttle mechanism 110 is comprised of an elongated shuttle guide member 112 of U-shaped cross-section and a shuttle or carrier member 114 mounted for reciprocal movement upon and along guide member 112 and toward and away from arbors 74, 76. Shuttle guide member 112 is comprised of an elongated base 116 forming the base of the U-shaped cross-section from which a pair of spaced apart rails 118, 120 extend to comprise the legs of the U-shaped cross section. Rails 118, 120 include a guide surface 122 and 124, respectively, facing toward each other and extending in a parallel relationship. Guide member 112 is disposed with one of its ends proximate winding arbors 74, 76 in such a manner that surface 122 and 124 are arranged perpendicular to the axis of rotation of winding arbors 74, 76.

Shuttle member 114 is mounted on guide member 112 for reciprocal movement in the direction parallel to guide surfaces 122 and 124. Shuttle member 114 is comprised of a shuttle base portion 126 having oppositely facing surfaces 128, 130. Surface 128 of shuttle member 114 is adapted to slidingly engage support surface 132 of guide member 112 whereby shuttle member 114 is supported for the aforementioned reciprocal movement. Surface 130 of shuttle member 114 is adapted to engage and support electrode 102. A first fixed wall element 134 extends outwardly from base portion 126 of shuttle member 114 and cooperates with a second moveable wall element 136 and surface 128 to define an open-ended recess 138 in shuttle member 114 into which electrode 102 is received. Moveable wall element 136 is pivotable about pin 140 from a first position wherein the wall element 136 is spaced apart from fixed wall element 134 by a distance substantially greater than the width W of electrode 102 to a second position wherein the wall element 136 is spaced apart from fixed wall element 134 by a distance substantially equal to the width W of electrode 102. Accordingly, fixed wall element 134 and moveable wall element 136 define a recess 138 having a width variable in accordance with the position of moveable wall element 136. With moveable wall element 136 in the aforementioned first position, variable recess 138 has a width substantially greater than the width of electrode 102. With moveable wall element 136 in the aforementioned second position, variable recess 138 has a width substantially equal to the width of electrode 102. Accordingly, means in the form of wall elements 134, 136 have been provided for receiving an electrode strip 102 and for aligning the electrode strip for presentation to winding arbors 74, 76.

With moveable wall element 136 in the aforementioned first position, the width of variable recess 138 is sufficiently large that electrode 102 may be easily placed in recess 138 even by an automatic pick and place mechanism. The previously described difficulties encountered by prior art approaches requiring a tight or snug fit between the recess and the electrode are avoided. After loading of electrode 102 into recess 138 shuttle member 114 is translated to the left (as viewed in FIG. 7) along guide member 112 by shuttle member moving or translating means in the form of actuator rod 140. Actuator rod 140 is connected to a conventional source of motive power such as a cam follower mechanism or an air powered cylinder. Guide surfaces 122 and 124 of guide member 112 slidingly engage complementary surface 142 and 144, respectively, on shuttle member 114. In this manner, shuttle member 114 is guided for movement along a line parallel to surfaces 122 and 124 and hence along a line perpendicular to the axis of rotation of arbors 74, 76.

Figure 9:
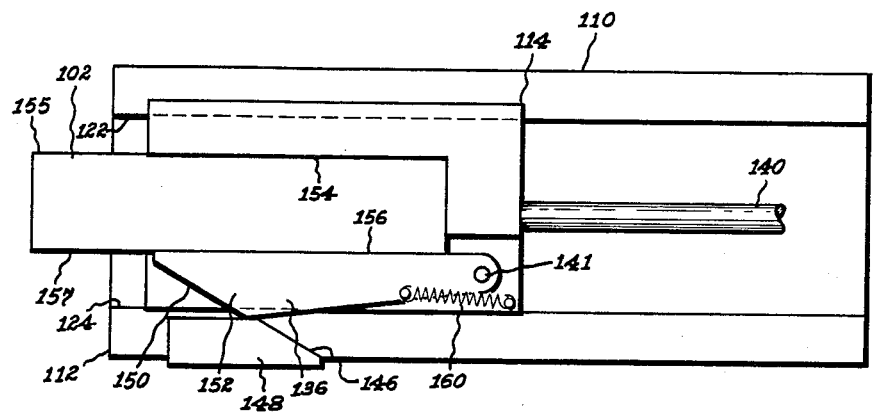
FIG. 9 schematically depicts the shuttle mechanism shown in FIG. 7 in a second position.

Referring now to FIG. 9, there is schematically depicted the shuttle mechanism 110 after shuttle member 114 has been translated to a position presenting the leading edge of electrode 102 to arbors 74 and 76. It is readily observed that movement of shuttle member 114 by actuator 140 from the position in FIG. 7 to the position shown in FIG. 9 has caused wall element 136 to move from its first position to its second position. Movement of wall element 136 is accomplished by means for moving moveable wall element 136 and for varying the width of the recess 138. More specifically, means for moving moveable wall element 136 is provided in the form of cam surface 146 of cam 148 affixed to guide member 112 and cam follower surface 150 of cam follower 152 affixed to moveable wall element 136. The aforementioned left-ward movement of shuttle member 114 enables the width of recess 138 to be varied by causing cam follower surface 150 to engage and ride up on cam surface 146 thereby rotating moveable wall element 136 clockwise (as viewed in FIG. 9) about pivot 141 until moveable wall element 136 is disposed in its aforementioned second position. In this position moveable wall element 136 is spaced apart from fixed wall element 134 by a distance substantially equal to the width of electrode 102. In this second position, aligning surface 154 on fixed wall element 134 and aligning surface 156 on moveable wall element 136 are in respective engagement with edges 155 and 157 of the electrode 102. Aligning surfaces 154 and 156 are parallel to guide surfaces 122 and 124 on guide member 112 and hence are perpendicular to the axis of rotation of arbors 74, 76. Accordingly, movement of moveable wall element 136 to its second position causes alignment of electrode 102 such that it extends substantially perpendicular to the axis of rotation of winding arbors 74, 76. Electrode 102 is thus presented to winding arbors 74, 76 in an unskewed orientation and will be wound without spiralling of the electrode. After the leading edge of electrode 102 is gripped by the arbors 74 and 76, shuttle member 114 is moved to the right (as viewed in FIG. 9) whereby electrode 102 exits recess 138 and whereby moveable wall 136 pivots counter-clockwise to its first position due to the disengagement of the cam follower 152 from the cam 148 and due to the force exerted by tension spring 160. While a shuttle mechanism 110 has been described for presenting electrode 102 to arbors 74, 76, it should be understood that an identical shuttle mechanism is provided to present electrode 104 to arbors 74, 76.

While the preferred embodiment of my invention has been fully described in order to adequately explain its principles, it is understood that various modifications or alterations or other embodiments may be utilized without departing from the scope of the appended claims.

We claim:

1. A method for contemporaneously winding into a cylindrical configuration first and second unwound electrode assemblies of an electrochemical cell, each of said assemblies comprised of a negative electrode strip, a positive electrode strip and a separator disposed therebetween, said method comprising the steps of:
   providing first and second winding stations;
   partially winding at said first winding station said first unwound electrode assembly into a first partially wound electrode assembly;
   transferring said first partially wound electrode assembly from said first winding station to said second winding station;
   further winding at said second winding station said first partially wound electrode assembly; and
   partially winding at said first station said second unwound electrode assembly into a second partially wound electrode assembly contemporaneously with said further winding of said first partially wound electrode assembly at said second winding station.

2. The method set forth in claim 1 further comprising the step of:
   providing a cell container;
   providing a third station for inserting said further wound electrode assembly into said container;
   moving said further wound electrode assembly to said third station;
   inserting said further wound electrode assembly into said container at said third location; and
   removing said cell container with said further wound electrode assembly inserted therein from said third station.

3. The method as set forth in claim 2 further comprising the step of:
   providing said separator to said unwound electrode assembly at said first station from a continuous roll of separator material.

4. The method as set forth in claim 3 wherein said transferring step includes transferring said first partially wound electrode assembly to said second winding station while said separator is connected to said continuous roll.

5. The method as set forth in claim 4 further comprising the step of:
   severing said separator from said roll after said first partially wound electrode assembly has been transferred from said first winding station.

6. The method as set forth in claim 5 further comprising the step of:
   providing grasping means for grasping the separator prior to said severing step at a location between said first and second winding stations.

7. The method as set forth in claim 6 wherein said severing step includes severing said separator from said roll between said location and said second winding means.

8. A method for contemporaneously winding into a cylindrical configuration first and second unwound electrode assemblies of an electrochemical cell, each of said assemblies comprised of a negative electrode strip, a positive electrode strip and a separator disposed therebetween, said method comprising the steps of:
   providing first and second winding stations;
   providing a first orbiting wheel having first and second pairs of winding arbors disposed at said first and second winding stations respectively and mounted for rotation relative to said first orbiting wheel;
   partially winding with one of said arbor pairs said first unwound electrode assembly into a first partially wound electrode assembly at said first winding location;
   rotating said orbiting wheel to transfer said one of said arbor pairs and said first partially wound electrode assembly from said first winding station to said second winding station and to simultaneously transfer the other of said arbor pairs from said second winding station to said first winding station;
   partially winding with said other of said arbor pairs said second unwound electrode assembly into a second partially wound electrode assembly at said first winding station; and
   further winding with said one of said arbor pairs said first partially wound electrode assembly into a further wound electrode assembly at said second winding station simultaneously with said partial winding of said second partially wound electrode assembly at said first winding station.

9. The invention as set forth in claim 8 further comprising the steps of:
- providing a rotatable second transfer wheel having a channel for receiving said first partially wound electrode assembly;
- providing for said further winding step in said channel;
- rotating said second transfer wheel to transfer said channel and said further wound electrode assembly to an index position for removing said further wound electrode assembly from said channel; and
- inserting said further wound electrode assembly into a cell container at said index position.

10. The invention as set forth in claim 9 further comprising the steps of:
- providing a third canning wheel having a recess for receiving said cell container;
- providing a cell container in said recess;
- positioning said recess and said cell container in a registering adjacent relationship with said index position;
- removing said further wound electrode assembly from said channel and into said cell container at said index position; and
- rotating said third canning wheel to move said cell container containing said further wound electrode assembly from said index position to a position for removing said cell container from said recess.

* * * * *